United States Patent [19]
Leeds et al.

[11] 3,897,465
[45] July 29, 1975

[54] ETHYL BETA-(N-METHYLFURFURYLAMINO) PROPIONATE

[75] Inventors: Morton W. Leeds, Murray Hill; Alex J. Szur, North Plainfield, both of N.J.

[73] Assignee: Airco, Inc., Montvale, N.J.

[22] Filed: May 7, 1973

[21] Appl. No.: 357,964

Related U.S. Application Data

[62] Division of Ser. No. 129,129, March 29, 1971, Pat. No. 3,760,082.

[52] U.S. Cl. .............................. 260/347.4; 424/285
[51] Int. Cl. .............................................. C07d 5/16
[58] Field of Search ..................... 260/347.4, 347.5

[56] References Cited
OTHER PUBLICATIONS

Mallik et al., "Zeitschrift fur Physikalische Chemie Neue Folge," Bd. 25, s. 205 & 215.
Southwick et al., "J. of Amer. Chem. Soc.," Vol. 75, 1953, p. 3416.

Primary Examiner—Harry I. Moatz
Attorney, Agent, or Firm—Roger M. Rathbun; Edmund W. Bopp; H. Hume Mathews

[57] ABSTRACT

This invention relates to the compound ethyl $\beta$-(N-methylfurfurylamino) propionate having the formula:

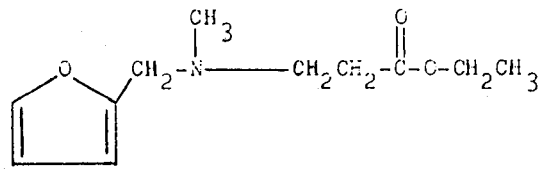

its water soluble salts and a method of preparing the compound by reacting ethyl acrylate with N-methylfurfurylamine. Compositions containing an effective amount of the compounds of the present invention are useful for tranquilizing and producing analgesia in mammals.

3 Claims, No Drawings

ETHYL BETA-(N-METHYLFURFURYLAMINO) PROPIONATE

DESCRIPTION OF THE INVENTION

This is a division of application Ser. No. 129,129, filed Mar. 29, 1971, now U.S. Pat. No. 3,760,082.

This invention relates to the compound ethyl β-(N-methylfurfurylamino) propionate and its water soluble salts which are useful for producing both analgesia and tranquilizing effects when administered to mammals.

The compound ethyl β-(N-methylfurfurylamino) propionate has the following formula:

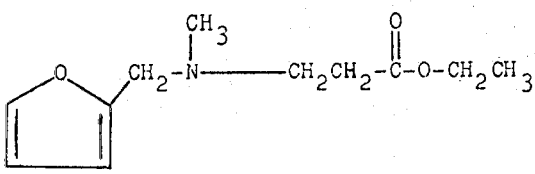

It is normally a clear, colorless liquid with a boiling point of 81.5°C. at 0.4 mm., a refractive index of $n_D^{20}$ 1.4700, and a molecular weight of 211.25. The compound is readily soluble in ether and can be used as an intermediate in the preparation of solid acids salts of the following formula:

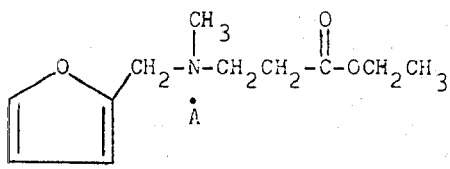

where A is selected from the group consisting of hydrogen chloride, hydrogen bromide, hydrogen iodide, phosphoric acid, sulfuric acid, citric acid, and any other salt-forming compounds which do not react with the parent compound to interfere with its utility.

The compound ethyl β-(N-methylfurfurylamino) propionate can be prepared through the reaction of ethyl acrylate and N-methylfurfurylamine. Both starting materials are well known and readily available commercially. The reaction can be carried out at atmospheric pressure and at temperatures up to the boiling point of ethyl acrylate (99.4°C.). The reaction is exothermic so the temperature of the reaction mass can be controlled by the rate of addition of one of the reactants. The preferred temperature range is 40°-50°C. where the ethyl acrylate will not flash off upon addition and yet the temperature is high enough to insure a rapid reaction.

It is convenient in carrying out the reaction to use an excess of the ethyl acrylate to insure that the N-methylfurfurylamine is completely reacted. Ethyl acrylate has a low boiling point (99.4°C.) in comparison to N-methylfurfurylamine (148°-149°C.) and can be readily separated from the reaction mass by fractional distillation. Also, since it is very likely that a solid salt of the amine will be prepared from the parent compound it is good procedure to attempt to completely react the starting amine so that it will not compete in the salt-forming reaction forming an undesirable product that would have to be separated. After the reaction has taken place, the compound ethyl β-(N-methylfurfurylamino) propionate can be separated from the reaction mass and purified by means of vacuum distillation.

The compound ethyl β-(N-methylfurfurylamino) propionate can be converted into its water soluble salt by first dissolving the amine ester material in ether followed by reacting with the salt-forming reagent. For example, when it is desired to prepare the hydrochloride, gaseous hydrogen chloride can be bubbled through the ether solution to precipitate out the hydrochloride as a white crystalline solid. The latter compound is a white, crystalline solid having a melting point of 119°-120°C. and a molecular weight of 247.72. The compound ethyl β-(N-methylfurfurylamino) propionate hydrochloride can be used either as a solid or as an aqueous solution to produce analgesia and tranquilizing effects in mammals.

The following examples will illustrate the procedural steps leading to the preparation of ethyl β-(N-methylfurfurylamino) propionate and a representative water soluble salt, ethyl β-(N-methylfurfurylamino) propionate hydrochloride.

EXAMPLE 1

PREPARATION OF ETHYL β-(N-METHYLFURFURYLAMINO) PROPIONATE

To a three necked round bottom flask (250 ml.) equipped with a water-jacketed reflux condenser, a dropping funnel and a stirrer, was added N-methylfurfurylamine (83.5 g., 0.75 mole). To this material there was then added drop-wise and with stirring, ethyl acrylate (83.5 g., 0.83 mole). On addition of the ethyl acrylate an exotherm was observed with the temperature of the reaction mass rising to 40°-50°C. This temperature was maintained and controlled by the rate of addition of the ethyl acrylate. When the addition was completed, the reaction mixture was heated at 40°-50°C. for 4 hours. The reaction mass was then vacuum distilled to yield 144.9 g. (0.69 mole), 91.5% conversion of ethyl β-(N-methylfurfurylamino) propionate, b.p. 81.5°C./0.4 mm., $n_D^{20}$ 1.4700.

EXAMPLE 2

PREPARATION OF ETHYL β-(N-METHYLFURFURYLAMINO) PROPIONATE HYDROCHLORIDE

The clear liquid prepared according to Example 1 was dissolved in ether and transferred to an Erlenmeyer flask. A gas bubbler tube was then placed in the ether solution and hydrogen chloride gas was slowly bubbled through the solution. As the gas bubbled through the solution, a while crystalline solid separated. After all of the solid had precipitated out of the ether solution, the solution was filtered and washed with ether and dried at 40°C./0.4 mm. for 4 hours to yield the pure crystalline product. Melting point 119°-120°C.

Analysis for $C_{11}H_{18}ClNO_3$:

Calculated: C, 53.4; H, 7.34; Cl, 14.31; N, 5.66.
Found: C, 53.2; H, 7.33; Cl, 14.30; N, 5.73.

The compound ethyl β-(N-methylfurfurylamino) propionate hydrochloride was selected for testing in view of its ready solubility in water and ease or preparation. Before testing the compound for physiological activity, the $LD_{50}$ of the compound was determined. The $LD_{50}$ corresponds to the amount of the compound necessary to kill 50% of the mice tested in a given period of time. The compound was administered intraperitoneally to 48 CF 1-S adult female mice. As a result of this administration, the $LD_{50}$ of ethyl β-(N-methylfurfurylamino) propionate hydrochloride was determined to be 3,500 mg./kg. The compound was thus shown to be extremely safe for use in the testing program.

In order to test the effectiveness of the composition of the present invention in producing analgesia and tranquilizing effects in warm-blooded mammals, solutions of the compound were prepared in a pharmaceutically acceptable carrier. Since the compound of interest is water-soluble, water serves as a convenient carrier. Any other pharmaceutically acceptable carrier in which the compound is soluble would also be suitable; for example, a 45% aqueous sucrose solution and an isotonic saline solution. If desired, the compound could also be used in solid form mixed with a suitable diluent in a pill or tablet. Calcium carbonate and lactose or milk sugar are suitable diluents for making up the solid form for administration. The compound of the present invention was tested for physiological response on groups of CF 1-S adult female mice. The compound was administered to the mice intraperitoneally in doses of 350 mg./kg. to 1,000 mg./kg. In the analgesiometric studies, an aqueous solution of the test compound was administered to the animals. After a 1 hour delay, groups of the mice were tested by the hot plate method, the tail clip method, and the tail dip method.

The hot plate method records the temperature at which a mouse leaps to escape discomfort. The apparatus comprises a pair of matched hot plates. Jumping temperatures are recorded for a group of animals to establish the normal range. Any of the animals outside the given range are discarded. Satisfactory animals are divided into two groups. The experimental group receives the test compound and the control group an equivalent volume of solvent (water or sugar solution). Morphine-injected controls are used as a comparison to the experimental drug. The results obtained show whether or not the test drug has morphine-like activity. The results obtained from the hot plate test are shown in the following table. It can be noted from this data that analgesia is produced similar to that obtained with 5 mg./kg. of morphine sulfate.

TABLE 1

HOT PLATE METHOD

| DRUG | DOSE | CHANGE IN JUMPING TEMP.(°C.) |
|------|------|------------------------------|
| Water | 10 ml./kg. | −8.0 |
| Compound* | 350 mg./kg. | +1.6 |
| Compound** | 5 mg./kg. | +4.0 |

*Ethyl β-(N-methylfurfurylamino) propionate hydrochloride
**Morphine sulfate

In the tail clip method, a rubber-sheathed artery clip is applied to the base of the tail. Normal response for an untreated mouse is to bite the clip and make repeated attempts to remove the irritant. An effective analgesic either extends the reaction time or renders the animal insensitive to the clip within the given time interval of 15 seconds. The observations are made at 30 min. and 1 hr. following the injection. The results are reported in the following table and clearly show that analgesia was produced in the test mice.

TABLE 2

TAIL CLIP METHOD

| DRUG | DOSE | RESPONSE TO CLIP | |
|------|------|------------------|--|
| | | 30 Min. | 1 Hr. |
| Compound* | 700 mg./kg. | Indifferent | Delayed response |

*Ethyl β-(N-methylfurfurylamino) propionate hydrochloride

In the tail dip method, a mouse produces a characteristic reaction when its tail is dipped entirely into water maintained at 55°C. A violent jerk of the tail takes place quite readily in untreated animals. The reaction can be markedly changed by injection of an analgesic. The results clearly enable one to identify morphine-like activity. The observations are made at 45 minutes after injection of the drug.

TAIL DIP METHOD

Four mice injected with 1,000 mg./kg. of ethyl β-(N-methylfurfurylamino) propionate hydrochloride. Two mice were tested after 30 minutes, when one squeaked and one didn't. The other two were tested after 45 minutes and both made movements of lifting their tails out of the water like morphine-treated mice do. At this time, these mice neither squeaked nor struggled. Because of this type of response, these same two mice were tested again at 60 minutes, when they showed reduced struggling and squeaking after a delay.

In testing a compound for tranquilizing activity, the over all appearance of the mice is noted during the course of the analgesiometric studies. If the animals appear insensitive to handling by the laboratory technician, and if they are not cowardly or do not attempt to escape from the grasp of the technician, then this is a clue suggesting that the compound might have tranquilizing activity. In order to further determine this, a so-called crowding experiment is carried out. In this experiment, 21 mice are placed into a 9 × 9 × 8 inch cage where they will normally become highly excited due to the crowding in new surroundings. After being in this cage for a short time, the mice are removed one at a time and injected intraperitoneally with an aqueous solution of the compound to be tested. Following the injection, the mice are placed into a second cage of the same size and configuration. If the compound is an effective tranquilizer, the mice will become quiet, unexcited and less active under the same conditions which had just induced great disturbance of the mice in the undrugged state. When this experiment was carried out with a group of mice injected with 700 mg./kg. of the ethyl β-(N-methylfurfurylamino) propionate hydrochloride the mice became quiet, undisturbed and no longer showed the irritability which accompanied the crowding. The compound clearly exhibits tranquilizing activity.

The effective amount of the compound of the present invention to be used in producing analgesia or in tranquilizing the warm-blooded mammals can easily be determined through observation of the mammals. The analgesia and state of tranquility produced are essentially dose dependent. Since the $LD_{50}$ of 3,500 mg./kg. is far beyond what would be needed to produce analgesia or a state of tranquility, a large amount of the material can be safely given to an animal to produce the desired result. The manner of administering the compound is not critical. The compound can be given as a solid in admixture with a suitable diluent such as calcium carbonate or the compound can be administered in aqueous solution. In view of the ready solubility of the compound in water, aqueous solutions can be easily and accurately prepared for use and this is the preferred mode of administering the composition.

We claim:

1. A compound selected from the group consisting of ethyl β-(N-methylfurfurylamino) propionate and a water soluble salt of ethyl β-(N-methylfurfurylamino) propionate.

2. The compound ethyl β-(N-methylfurfurylamino) propionate.

3. A compound consisting of a salt of ethyl β-(N-methylfurfurylamino) propionate, said salt being selected from the group consisting of the hydrogen chloride salt, the hydrogen bromide salt, the hydrogen iodide salt, the phosphoric acid salt, the sulfuric acid salt, and the citric acid salt.

* * * * *

UNITED STATES PATENT OFFICE
CERTIFICATE OF CORRECTION

PATENT NO. : 3,897,465
DATED : July 29, 1975
INVENTOR(S) : Morton W. Leeds and Alex J. Szur It is certified that error appears in the above-identified patent and that said Letters Patent are hereby corrected as shown below:

Col. 1, line 6, "Pat. No. 3,760,082" should read -- Pat. No. 3,760,086 --.

Signed and Sealed this second Day of December 1975

[SEAL]

Attest:

RUTH C. MASON
Attesting Officer

C. MARSHALL DANN
Commissioner of Patents and Trademarks